350-3.79 SR
XR 3,770,886

United Stat
Kiemle

[11] 3,770,886
[45] Nov. 6, 1973

[54] ONE DIMENSIONAL HOLOGRAPHIC RECORDING OF ELECTRICAL SIGNALS

[75] Inventor: Horst Kiemle, Munich, Germany

[73] Assignee: Siemens Aktiengesellschaft, Berlin & Munich, Germany

[22] Filed: Oct. 27, 1971

[21] Appl. No.: 192,832

[30] Foreign Application Priority Data
Nov. 13, 1970 Germany .................. P 20 56 025.2

[52] U.S. Cl. 178/6.7 R, 179/100.1 A, 179/100.3 G, 179/100.3 V, 350/3.5
[51] Int. Cl. ......................... H04n 5/84, G02b 27/00
[58] Field of Search ...................... 350/3.5; 352/103; 178/6.7 R, 6.7 A; 346/107 R, 108; 179/100.3 G, 100.3 V, 100.1 A

[56] References Cited

UNITED STATES PATENTS

| | | | |
|---|---|---|---|
| 3,562,422 | 2/1971 | McMann | 178/6.7 A |
| 3,534,166 | 10/1970 | Korpel | 178/6.7 A |
| 3,404,224 | 1/1968 | Revelo et al. | 352/103 |
| 3,545,834 | 12/1970 | Gerritsen et al. | 350/3.5 |
| 3,610,722 | 10/1971 | Bestenreiner et al. | 350/3.5 |

FOREIGN PATENTS OR APPLICATIONS

| | | | |
|---|---|---|---|
| 1,139,955 | 1/1969 | Great Britain | 350/3.5 |

OTHER PUBLICATIONS

Arm et al., Applied Optics, Vol. 8, No. 7, July 1969, pp. 1413–1419.

*Primary Examiner*—David Schonberg
*Assistant Examiner*—Ronald J. Stern
*Attorney*—Carlton Hill et al.

[57] ABSTRACT

The present invention is directed to a method of recording information, which is in the form of electrical signals, on a storage medium by simultaneously exposing the light sensitive storage medium with a light beam which is modulated with the electric signals to be recorded and a reference light beam to form a track of information in the form of holograms on the storage medium. The method further includes retrieving the information contained in the holograms of the track of information by projecting a light beam on the track of holograms to form a reconstructed image and detecting the information from the images with a photoelectric transducer which converts the information in the reconstructed images into electrical signals. In one embodiment of the invention, sound signals are recorded in a sound groove adjacent to the information track of holograms and are retrieved simultaneously with retrieving information from the hologram track of information. To retrieve information from this embodiment, a retrieval apparatus having a needle for retrieving information in the sound groove on an information retrieval head which includes a device for projecting the reading light beam and a photodetector for detecting information retrieved by the reading light beam. The needle of the sound head also functions to guide the reading light beam along the information track as the needle moves in the sound groove. The invention also relates to a storage medium having a sound groove for storing sound signals and an information track of holograms formed on a light sensitive surface thereof.

20 Claims, 10 Drawing Figures

3770886
OR IN 178/6.7R

INVENTOR
Horst Kiemle
BY
Hill, Sherman, Meroni, Gross & Simpson
ATTYS.

INVENTOR
Horst Kiemle
BY
Hill, Sherman, Meroni, Gross & Simpson
ATTYS.

INVENTOR
Horst Kiemle
BY
Hill, Sherman, Meroni, Gross & Simpson
ATTYS.

ONE DIMENSIONAL HOLOGRAPHIC RECORDING OF ELECTRICAL SIGNALS

BACKGROUND OF THE INVENTION

1. Field of the Invention

The present invention is directed to a storage medium for storing information, a method for recording the information and retrieving the information and an apparatus for retrieving information from the storage medium. In particular the invention is directed to utilizing a pair of light beams as a means of providing a track of holograms on a storage medium which holograms contain the information signal to be recorded.

2. Prior Art

The storage of information which is in the form of electrical signals on a light sensitive storage medium such as a light sensitive film or tape is known in itself. An example is the storage of information in a sound track of a film wherein speech and musical signals are used to intensity modulate a light beam which is projected onto the film to record the information by varying degrees of exposure of the film. In retrieving the information, a light beam is passed through the film to cause variations in the intensity of the light beam which variations in intensity are received by a photoelectric device to convert the modulation of the retrieval beam into the electrical signals. It is also known to use photographic material for recording of a video signal in order to record television shows. However the high sensitivity of prior art methods to interference and the relatively small signal to noise ratio are drawbacks to these methods.

SUMMARY OF THE INVENTION

The present invention is directed to a storage medium, a method of recording and retrieving information and an apparatus for retrieving information from the storage medium which method provides information on a storage medium that has a high interference safety, a high signal to noise ratio, and a high storage density. The invention is accomplished by a method of simultaneously projecting a modulated first coherent light beam and a second coherent light beam onto a light sensitive storage medium with relative movement therebetween to produce an information track of one dimensional holograms in the direction of the track with the first and second light beams being synchronously pulsed to form discrete holograms in the information track. Modulation of the first coherent light beam can be an amplitude modulation or modulation of the direction of polarization of the light beam in response to the electrical signals to be recorded. Preferably, the two light beams are focused in one dimension onto the storage medium during recording and during retrieval the reading light beam is also focused in the same direction. The holograms can be recorded on a storage medium which is a tape, a disc or a circular plate similar to a record, or a cylindrical surface. In one embodiment of the invention, a sound signal is also recorded in a sound groove which may include both a sound signal and a color signal for the picture information being recorded as a track of hologram. During retrieval of the information from the storage medium with a sound groove and hologram track, a scanning means has a needle tracking in the sound groove and supports means projecting a light beam for scanning the holograms and a photoelectric transducer. The scanning means utilizes the tracking of the needle in the sound groove to guide the reading light beam along the hologram track. The holograms can be recorded on a transparent tape so that the reading light projects therethrough during retrieval or it can be formed as a surface relief hologram which enables reproducing by pressing in a manner similar to records and if it has reflective surfaces, forms a reconstructed image during retrieval that is a reflection image. When recording a hologram with a sound groove, it may be recorded at the base of the sound groove or adjacent one edge thereof. The light beam for reading the hologram track can be from a laser or a suitable spectrum lamp such as luminescent diode with a narrow band interference filter.

DESCRIPTION OF THE PREFERRED EMBODIMENTS

The principles of the present invention are particularly useful in providing a storage medium such as a tape or band 1 with an information track in which the information is recorded in the form of one dimensional holograms 2 with the one dimension extending in the direction of the track.

Figure 1:
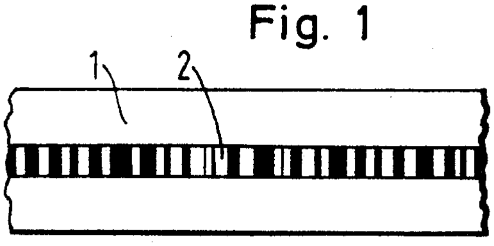
FIG. 1 illustrates a strip of storage medium with an information track of one dimensional holograms recorded thereon.
Figure 2:
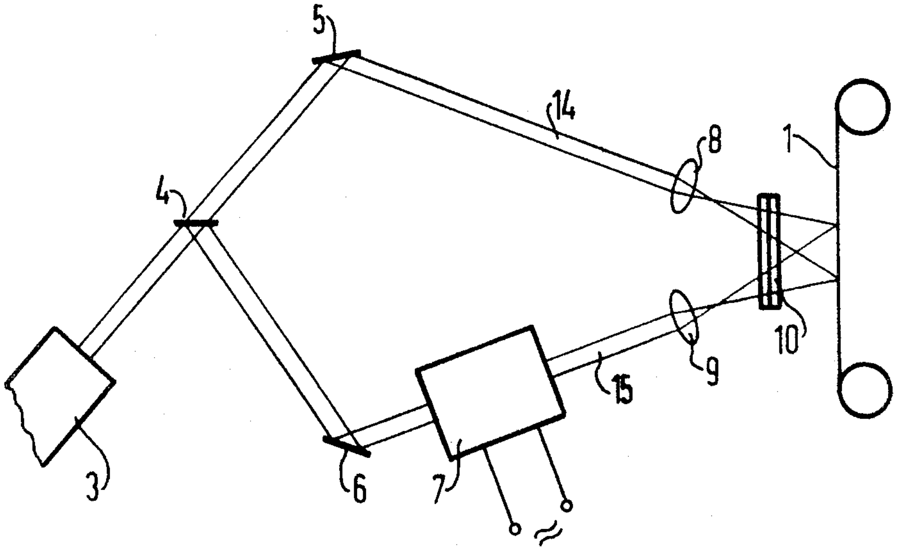
FIG. 2 is a diagrammatical illustration of a device for recording information according to the method of the present invention.

To record information such as in the form of electrical signals on the storage medium 1, a recording device diagrammatically illustrated in FIG. 2 can be utilized. The storage device has a laser 3 producing a coherent light beam which is split into two portions by a partially permeable mirror 4 with one portion 14 being deflected by a mirror 5 onto a spherical lens 8. The other portion 15 is deflected by a deflecting mirror 6 through a modulator 7 to a spherical lens 9. The beams 14 and 15 are focused by the spherical lenses 8 and 9 and are preferably further focused in one dimension onto the light sensitive tape or band 1 of the storage medium by a cylindrical lens 10 or cylindrical mirror. The laser 3 can be a laser with a mode coupling which with correct dimensioning produces a pulse automatically or it can be a continuously operating laser with an external amplitude modulator.

The modulator 7, which modulates the beam 15 with the signals to be recorded, can be an amplitude modulator which amplitude modulates the beam 15 in response to the electrical signals being applied to the modulator. If modulation of the beam 15 is to be a modulation of the direction of polarization of the light beam, the beam 15 is first polarized and the direction of polarization is modulated by the modulator 7 in accordance to the signals to be recorded with a complete modulation being a rotation of the direction of polarization by 90°. Modulators which either modulate the amplitude of a coherent light beam or modulate the direction of polarization are both well known in the prior pulses To produce the relative movement between the storage medium 1 and the simultaneously projected beams 14 and 15 forming the holograms 2 on the storage medium the tape 1 is advanced. Since this movement of the tape will cause the recording of time variable signals, the tape during subsequent retrieval or a reading process is also moved relatively to the scanning device. Since the interference pattern of the hologram projected onto a moving storage medium such as the tape 1 would smear the interference patterns of the hologram being recorded with a corresponding erasing of the information being recorded, the first and second coherent light beams which are the modulated beam 15 and the reference beam 14 are split into short pulses in order to divide the information to be recorded into discrete portions. The duration of the short pulses is selected so that the movement between the storage medium and the interference field is only a minor fraction of the smallest interference fringe interval which occurs. The frequency of the pulsing or sampling frequency of the first and second light beam must be at least twice as large, according to the sampling theorem, as the upper cut-off frequency of the signal to be recorded.

To retrieve the information from the tape 1, a reading apparatus has a light source 11, such as a continuously operating laser, producing a reading light beam or retrieval wave 16. The light beam 16 is focused in one dimension by a cylindrical lens 17 or cylindrical mirror and is projected through the storage medium 1, which as illustrated is transparent, and reconstructs images from the holograms contained on the information track of the storage medium 1 which image is a light beam modulated by the information retrieved. The modulated beam is focused by a second cylindrical lens 13 or mirror onto a photo detector or photoelectric transducer 12 which converts the modulated light beam back into electrical signals.

As the beam 16 projects onto the tape 1 it reconstructs a succession of luminous points each of which belongs to a scanning pulse during the recordation of the information and each of the luminous points is an image or copy of the modulated wave 15 during recording. As a consequence of the alternating illumination an alternating current develops in the detector 12 which forms the output transducer and after amplification this represents the video signal. The output of detector 12 is preferably passed through a low pass filter to remove the scanning frequency and then the filtered output frequency of electrical signals can be amplified to reproduce the information recorded such as a video signal.

It is known that when a hologram is lateraly placed along a light source which serves for reconstructing an image from the hologram, the picture or image which is reconstructed usually proceeds with another speed than the hologram. For this case it is more advantageous to find a dimensioning of the holographic parameters with which the ratio of the velocity of succession of reconstructed pictures to the hologram speed becomes as large as possible in order to be able to operate with as low a transportion speed of the storage medium as possible at a given upper cut-off frequency of the information to be recorded. It must also be taken into account that the picture element which is projected onto the photo detector does not contain abberations which would broaden by unavoidable defraction and which would lower the upper frequency limit of the information being reproduced.

Figure 4:
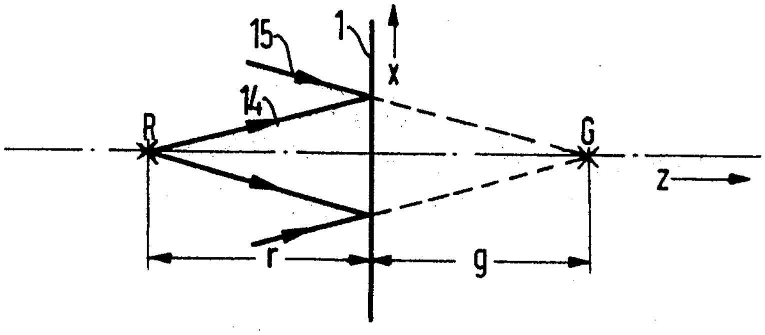
FIG. 4 is a diagram of the radiation path during recording to minimize coma and astigmatism in the information recorded.
Figure 5:
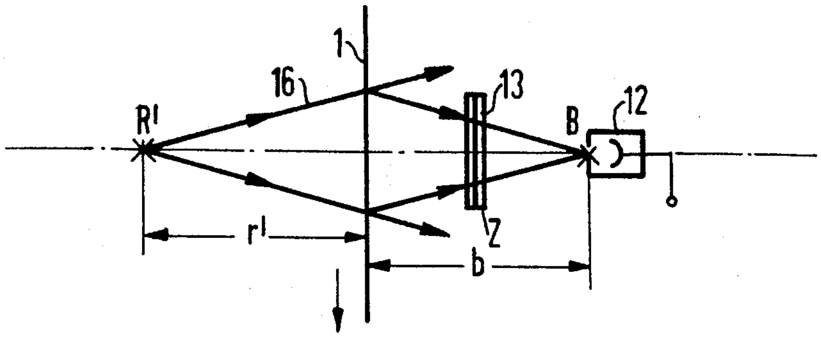
FIG. 5 shows a radiation path during retrieving operation in which coma and astigmatism are minimized.

In FIGS. 4 and 5 an arrangement is shown which reduces abberations due to coma and astigmatism. To accomplish this, a center R of the reference light beam 14 and a center G of the modulated light beam 15 lie on a line which extends perpendicular to the plane of the hologram recorded on the storage medium 1. During retrieval, as illustrated in FIG. 5, a center R' of the reference or reading light beam 16 and the center of the reconstructed picture element B both lie on a line which is also perpendicular to the storage medium 1 with the detector 12 being located at the center B of the reconstructed picture. The line formed by centers R and G and the line formed by centers R' and B are on the same axis. As shown in the drawings, the distance of the centers R and R' from the storage medium 1 are $r$ and $r'$ respectively and equal. In a similar manner, the distance of the reconstructed picture B and the object G from the storage medium are distances $b$ and $g$ which are also equal. Such an arrangement causes the reconstructed picture or image to be free from coma and astigmatism so that only spherical abberations must be taken into account.

Figure 6:
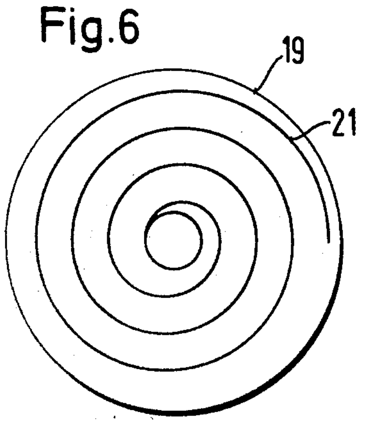
FIG. 6 illustrates a disc shaped storage medium.
Figure 7:
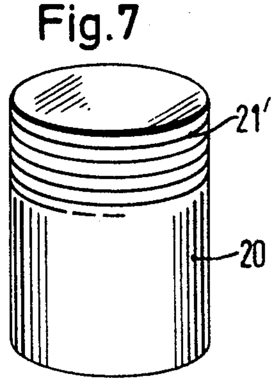
FIG. 7 shows a cylinder shaped storage medium.

One embodiment of the invention is a simultaneous storing of electrical signals in the form of holograms and sound signals so that the storage medium contains a complete video signal including control impulses. Such an arrangement is particularly advantageous when the storage medium is a circular plate or disc identified as 19 in FIG. 6 having a spiral sound groove 21. Another example of a storage medium is shown in FIG. 7 and is a cylindrical shaped storage medium 20 having a sound groove 21, which has a helical or spiral shape, on the cylindrical surface.

Figure 8:
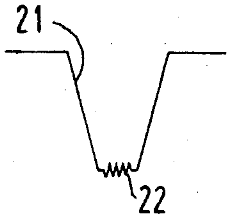
FIG. 8 is a cross section of a sound groove provided with a hologram.
Figure 9:
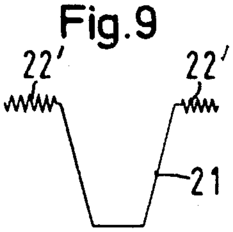
FIG. 9 shows another embodiment of a sound groove provided with a hologram.

In both of these storage mediums, an acoustical signal is recorded in the sound grooves such as 21 and the optical signal is recorded either as a hologram track 22 at the base of the sound groove 21 (FIG. 8) or as a hologram track 22' adjacent either or both edges of the sound groove (FIG. 9). If the side or walls of the groove are double modulated in a manner similar to that utilized in a stero recording, one side can contain a channel for the sound and the other for a color control signal for a video picture. Such an arrangement is simultaneously recorded with the sound and color signal being recorded on the sides of the grooves and the optical signal recorded as an information track of holograms either in the base of the groove or along an edge of the groove.

To retrieve the information from a storage medium having a sound groove and hologram information track, a scanning means such as the head 24 has a sound pick up including a needle 25 for retrieving information from the sound groove, and has a photoelectric transducer or photo detector 26 and a luminating device such as a fiber bundle 28 of light conducting fibers for guiding a reading beam of light to a point adjacent to the needle. The light projected by the luminating device produces a reflection hologram which is detected by the detector 26. In such a scanning head, the needle 25 has a second function of guiding the scanning means with the detector 26 and source 28 on the information track as it moves in the groove 21. The scanning means has appropriate electrical leads extending from the detector 26 and the needle 25 to devices to utilize the signals retrieved and light conducting fibers 28 can extend to a source from the scanning means.

Figure 3:
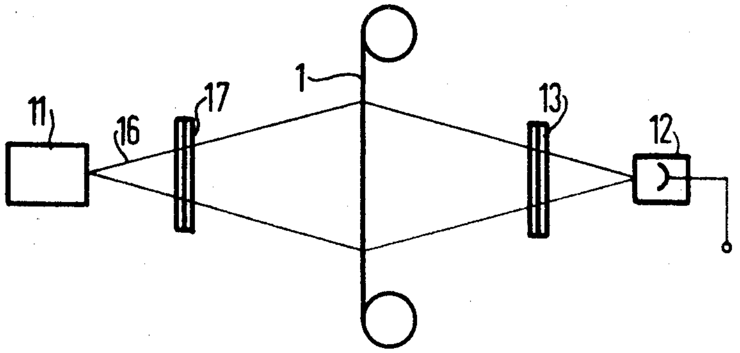
FIG. 3 is a diagrammatic illustration of a corresponding device for retrieving information from the storage medium.
Figure 10:
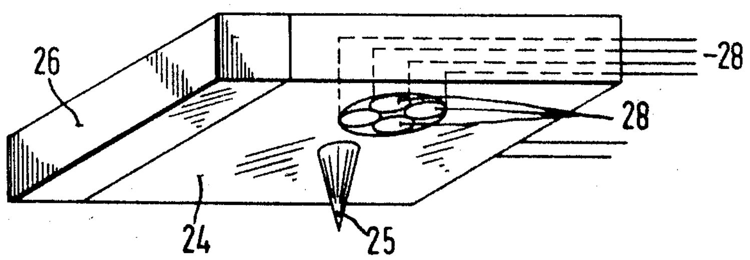
FIG. 10 diagrammatically illustrates a scanning device for retrieving information from a sound groove and hologram track.

The holograms recorded in the information track can be such that the retrieving beam such as 16 in FIG. 3 passes through the storage medium 1 with the reconstructed hologram or picture being directed on the detector. In the scanning device illustrated in FIG. 10, the holograms formed on the storage medium produce a reflection hologram picture. Such holograms are preferably surface relief holograms having mirrored surfaces which enable recording and the storing of information on each side of the circular plate or disc 19 in a manner similar to phonographic records. Furthermore, when the information contained in the holograms is stored as a surface relief hologram, copies can be reproduced by pressing in a manner similar to the pressing of phonograph records.

During recording of the information on the storage medium, a laser is used and the laser can be utilized for providing the reading light beam for retrieving the information from the storage medium. However to reduce the cost of the retrieving device, a suitable source of light from a spectrum lamp such as luminescent diode or a mercury arc lamp with a narrow band interference filter can be utilized in place of the laser. The light required for reconstruction of the image of the interference patterns of the hologram must only be approximately monochromatic and the power requirements are relatively modest due to focusing in the one direction. As discussed with the device illustrated in FIG. 10, the reading light beam can be conducted through a bundle of light conducting fibers to a point adjacent the information track of holograms which is very advantageous when retrieving both information from a sound groove and the information track of holograms.

With a conventional method for optical recording of information, having a speed of the storage medium of approximately 500 millimeters per second which corresponds to the groove speed of a 30 centimeter record moving at 33 rpm's and utilizing a reading light beam produced by a Helium-neon laser which has a wave length of 6328 Angstroms and a light wave apertural angle close to one, a cut-off frequency for the information being recorded is about 400 kHz. But with the holographic storage, a cut-off frequency of 800 kHz will result. To increase the upper cut-off frequency of the information storage, a smaller wave length can be utilized during recording than during reconstruction or retrieving. For instance by recording with a helium cadmium laser which has a wave length of 3,250 Angstroms and by retrieving with light beams from a helium neon laser, an upper cut-off frequency for the information being recorded is about 1.54 MHz which is sufficient for television pictures of average quality. Since the decrease of the frequency response is slow and continuous at the higher frequencies, a further rise in the upper cut-off frequency is possible, in a manner similar with magnetic tape devices, by means of electric distortion-correction of the electrical signal prior to utilizing the signal to modulate the recording beam of light. With distortion-correction and an increase in the holograph speed to about twice the above mentioned value, an upper frequency limit of 5MHz for the information being recorded can be obtained which frequency limit is required by European television standards.

Although various minor modifications might be suggested by those versed in the art, it should be understood that I wish to employ within the scope of the patent warranted hereon all such modifications that reasonably and properly come within the scope of my contribution to the art.

I claim:

1. In a method of storing information in an information track on a light sensitive storage medium by temporally modulating a light beam as a whole in response to information contained in the form of electric signals, projecting the modulated light beam on the storage medium while providing continuous relative movement therebetween to record the information in the information track and in which recorded information is retrieved with a reading light beam directed on the information track of the storage medium and a photo electric transducer for detecting information imparted to the reading light beam by the information track, the improvement in storing said information comprising simultaneously projecting a first coherent light beam modulated with the information to be recorded and a second reference light beam onto the storage medium, the step of projecting including focusing in a direction perpendicular to the track direction both the first and second beams so as to form one dimensional beams to jointly record a one dimensional hologram on the light sensitive storage medium in the track direction and synchronously pulsing the first and second coherent light beams as they are being projected onto the storage medium at a frequency which is at least twice as large as the upper cut-off frequency of the information being recorded.

2. In a method according to claim 1, wherein the modulation of the first light beam by the electrical signal is an amplitude modulation.

3. In a method according to claim 1, wherein the first light beam is polarized and the modulation of the first light beam by the electrical signal is by rotating the direction of polarization of the polarized first light beam.

4. In a method according to claim 1, wherein the storage medium is a tape and the relative movement between the storage medium and the first and second coherent light beams is provided by moving the tape relative thereto.

5. In a method according to claim 1, wherein the storage medium is rotated to provide a spiral shape track of information thereon during recording.

6. In a method according to claim 1, wherein the upper frequency limit of the information recorded by the first and second light beams is increased by electric distortion correction of the electrical signal used for modulation the first light beam.

7. In a method according to claim 1, wherein during retrieval, the reading light beam is one dimensionally focused in the direction of the recorded hologram dimension.

8. In a method according to claim 1, wherein the centers of the first and second coherent light beams during recording lie on a line extending perpendicular to the storage medium and the center of the reading light beam and the light beam with the information imparted from the information track each lie on a line which is perpendicular to the plane of the surface on which the hologram is recorded so that coma and astigmatism in the image reconstructed from the hologram is reduced.

9. In a method according to claim 1, further including the step of providing a sound groove on the storage medium and wherein the information track of one dimensional holograms is recorded in the base of the sound groove.

10. In a method according to claim 1, further including the step of providing a sound groove on the storage medium and wherein the information track of one dimensional holograms is recorded adjacent an edge of the sound groove.

11. In a method according to claim 1, wherein the information track of hologram is recorded in the form of a surface relief hologram.

12. In a method according to claim 11, wherein a surface relief hologram is recorded with mirror relief surfaces so that during reading out, the reading light beam is reflected by the mirror relief surfaces to form a reflection of the reconstructed hologram image.

13. In a method according to claim 1, wherein during recording of storage medium, the wave length of the light beams used for recording is smaller than the wave length of the light beam used for reading out the recorded information.

14. In a method according to claim 1, wherein during retrieval of the information from the information track on the storage medium, the storage medium is illuminated with a coherent light beam to form a reconstructed image of the information which is stored in the hologram and the reconstructed image is projected onto a photoelectric detector whereby the information is converted to electrical signals.

15. In a method according to claim 14, wherein the reading light beam is a continuous beam producing a sampling frequency on the photoelectric detector and which method includes providing a low pass filter to remove the sampling frequency produced by the photo detector.

16. In a method according to claim 14, wherein the reading light beam is produced by a laser.

17. In a method according to claim 14, wherein the reading light beam is produced by a spectrum lamp with a narrow band interference filter.

18. In a method according to claim 14, wherein the reading light beam is produced by a luminescent diode with a narrow band interference filter.

19. In a method according to claim 1, wherein the storage medium is provided with a sound groove with information recorded therein and with the hologram track of information recorded adjacent thereto, and in which information recorded on the storage medium is retrieved simultaneously by a needle retrieving the information recorded in the sound groove and a reading light beam retrieving the information from the hologram track of information.

20. In a method according to claim 1, which further includes the step of recording an information signal in a groove on the storage medium simultaneously with the recording of information in the hologram track of information.

* * * * *